United States Patent [19]

Oborn

[11] 3,966,991

[45] June 29, 1976

[54] ANGEL FOOD CAKE MIX

[75] Inventor: Robert Edward Oborn, Cincinnati, Ohio

[73] Assignee: The Procter & Gamble Company, Cincinnati, Ohio

[22] Filed: Oct. 16, 1975

[21] Appl. No.: 623,134

[52] U.S. Cl. ................................ 426/555; 426/554
[51] Int. Cl.$^2$............................................ A21D 2/02
[58] Field of Search ........... 426/555, 558, 552, 554, 426/549

[56] References Cited
UNITED STATES PATENTS 2,916,380  12/1959  Finucane ............................ 426/555
3,038,808  6/1962  Perrozzi et al. .................. 426/558 X
3,078,168  2/1963  Bedenk .............................. 426/555
3,149,979  9/1964  Bohn .................................. 426/554

Primary Examiner—Raymond N. Jones
Attorney, Agent, or Firm—Leonard Williamson; Louis G. Xiarhos; Richard C. Witte

[57] ABSTRACT

An improvement in the art of culinary mixes containing dried desugared egg white, particularly angel food cake mixes, is provided by adding an alkali metal bisulfite thereto in an amount of from about 0.005% to about 1.0% by weight of the dried desugared egg white.

11 Claims, No Drawings

ANGEL FOOD CAKE MIX

BACKGROUND OF THE INVENTION

This invention relates generally to an improvement in the art of culinary mixes containing dried desugared egg white. In another respect it relates to an improved process for the preparation of cakes of the foam batter type, particularly angel food cakes.

In one respect, the substance with which this invention is concerned is albumen, the material which is present in greater quantity than either the yolk or shell of the avian egg. As used herein, "albumen" refers to what is popularly known as the "egg white", and is distinguished from the "albumin", which is used to refer to a broader class of proteinaceous materials. Egg white is comprised chiefly or protein substances, and the substances generally said to be present are ovalbumin, constituting about 75% of the total solids in the albumen, ovomucoid, ovomucin, ovoconalbumin, and ovoglobulin. The functional characteristics of egg white are determined to a very great extent by the proteinaceous materials in the egg white, and especially by the ovalbumen present. Much of this functionality of egg white albumen is lost in the processing thereof, particularly in drying processes.

In many instances, it is desirable to separate the white of the egg from the yolk so that advantage may be taken of the peculiar properties of each of these two constituents. An example of the use of egg white in culinary mixes is in the preparation of angel food cake. In the preparation of angel food cake, the egg white from a large number of eggs is vigorously beaten in the absence of lipid substances to obtain a stable foam, and then the other ingredients are added. Egg white is also very important in the preparation of the so-called white cake.

Some angel cake mixes comprise at least two packages, one of which, hereinafter called the A-packet, contains a whippable material such as egg white, sugar and additives such as cream of tartar and sodium hexametaphosphate. A second package, hereinafter, called the B-packet, may contain flour and/or starch, additional sugar, a vegetable oil hardstock, and additives such as cream of tartar and flavoring. To prepare a cake from such a mix, water is added to the ingredients of the first package containing the whippable material, said material is whipped to a stable foam and the ingredients of the B-packet are gently folded into the foam. The batter so prepared is then ready for baking. Examples of angel cake formulations are set out in U.S. Pat. No. 3,078,168, Bedenk, Feb. 19, 1963.

Cake mixes of the foam batter type comprising an intimate mixture of all the ingredients contained in one package and requiring only the addition of water, whipping and baking to prepare a cake have been developed.

The principal problem in using dried egg white in the culinary arts is in obtaining from the dried egg white the performance of an equivalent amount of fresh eggs. The eggs, whether whole egg or egg white, are frequently denatured in the course of drying. Further damage can occur on storage and handling. Moreover, dried eggs are less effective than fresh eggs when used in combination with certain kinds of flour. For example, they may provide a good foam but when flour is added and the batter baked, a loss in egg-white functionality is observed.

It has been a common experience to find that unaged cake mixes provide extremely good quality, large volume cakes but are far less successful when aged for several months. The tolerance to recipe variation of the known mixes of the foam batter type which contain prior art dried egg white tends to be quite limited.

Another important problem in angel food cakes is cupping (surface depressions) on the inverted side of baked angel food cakes. Thus, the underside of a cake removed from an angel food tin or pan may be observed to have a series of cup-like depressions over a portion of the surface of the cake. Reduced functionality of the egg white appears to adversely affect the surface of the cakes. It also affects color, texture and flavor.

An object of this invention is to enhance the functionality of dried desugared egg white in culinary mixes.

Another object of this invention includes the provision of a composition of matter for use in preparing angel food-type cakes of reduced cupping, whiter color, increased volume, excellent texture, and increased recipe tolerance, particularly when dried eggs are employed in a dry cake mix.

A further object of this invention is to prepare a batter containing bisulfite and egg white in a functionally less impaired form.

Other objects of this invention will be apparent from the discussion hereinafter.

SUMMARY OF THE INVENTION

An improvement in the art of culinary mixes containing farinaceous materials, sugar and up to about 12% by weight of dried desugared egg white. More particularly, an improvement in angel food cake mixes is provided by including in the cake batter an alkali metal bisulfite in an amount, broadly, of from about 0.005 to about 1.0%, preferably from about 0.05 to about 0.5% and most preferably from about 0.14 to about 0.20%, by weight of the dried desugared egg white.

Improved culinary products are provided by adding the bisulfite to a prepared dry culinary mix or it can be dissolved in the mixing water from which the cake batter is made. It can be added directly to liquid desugared egg white prior to drying which, when dried, is used in a cake formulation. In the case of angel food cakes, cakes with the bisulfite included in the batter, can have substantially no cupping. In summary, the present invention provides improved culinary products which require less egg white in the formulation and which result in cakes of better flavor, better texture, and increased recipe tolerance.

DETAILED DESCRIPTION OF THE INVENTION

In accordance with this invention, an improvement in the art of culinary mixes containing flour and/or starch, sugar, and up to 12% by weight of dried desugared egg white, is provided, the improvement comprising adding an alkali metal bisulfite thereto.

Alkali metal bisulfite may be added to fresh liquid desugared egg white, which, in turn, may then be frozen or dried. If the egg whites are frozen, they may be kept for extended periods and then dried; adding bisulfite thereto will still provide enhanced egg white functionality.

It has been found that the level of alkali metal bisulfite should be from about 0.005 to about 1% by weight of the dried egg white used in a cake mix. Dried egg white, as used herein, refers to a substantially dry egg white material inclusive of moisture content which is present in an amount by weight of 12% or less. Preferably, the moisture content is not greater than about 9%. In general, as the amount of bisulfite added is increased so is the available desirable egg white functional groups; however, the best overall culinary results have been observed using egg whites having from about 1400 (or 0.14%) to about 2000 ppm (or 0.20%) of alkali metal bisulfite.

Sodium bisulfite is preferred. Other bisulfites having monovalent cations, such as potassium and ammonium, can also be used.

The features of this invention may be enjoyed by adding the bisulfite at several points in the process of preparing the culinary mix, for example, to the egg white compound just before drying or after drying. It may also be added to dry cake mixes or to cake batters containing egg white solids.

The advantages afforded by the present invention are illustrated by improvements shown in angel food cake bakes made with either dry mixes containing bisulfite and dried egg white or the batters of such mixes to which bisulfite is added to illustrate an increase in the functionality of the egg white therein.

Angel food cake mixes, in general, are comprised of at least three essential materials: edible farinaceous material, sugar and from about 6 to about 12% dried desugared egg white. Such mixes can be improved upon by adding an alkali metal bisulfite thereto in an amount of from about 0.005 to about 1.0% by weight of the dried egg white. In two-packet angel cake mixes, one packet will normally contain the desugared egg white and bisulfite; and a second packet, sugar and farinaceous material.

The advantages of alkali metal bisulfite in the preparation of improved angel food cakes can be realized by the inclusion of the bisulfite in any of a variety of angel food cake mix formulations generally known in the art. Examples of angel food cake mixes which can be improved by addition of alkali metal bisulfite are found in the U.S. Patent of Bedenk (U.S. Pat. No. 3,078,168) issued Feb. 19, 1963, which is incorporated herein by reference.

In a process for preparing cakes of the foam batter type which comprises preparing a batter from a cake mix containing from about 6 to about 12% by weight of dried desugared egg white, sugar and edible farinaceous materials, a process improvement is obtained by including an alkali metal bisulfite in the batter in an amount of from about 0.005 to about 1.0%, preferably 0.05 to about 0.50%, and most preferably from about 0.14 to about 0.20% by weight of the dried desugared egg white.

"Desugared" egg white contains less than about 1.0% glucose. Preferably, the glucose content will be 0.3% or less. Egg whites are desugared by either an enzymatic or a microbial process, both of which are widely known and used in the egg industry. The specifications for the desugared egg white used in the examples were: 0.2% maximum glucose; 6.5–7.5 pH; 8.0% maximum $H_2O$; 97% minimum through U.S. 100 mesh particle size; 25,000 maximum bacteria; negative Salmonella.

EXAMPLE I

Three samples of bisulfite-containing egg white, identified in Table I as Samples A through C, were prepared by homogeneously mixing U.S.P. sodium bisulfite with 10.16 kg. of liquid microbially desugared egg white and drying the resulting mixture by spray drying to a moisture content of less than 8% by weight. Each sample was dried in the same manner but differed in the amount of bisulfite incorporated into the egg white. Stated percentages are expressed as percentages by weight of the dry egg white inclusive of the moisture content of the egg white. The percentages are approximate and were calculated on the basis of the amount of bisulfite added to the liquid egg white and the approximate amount of dry egg white material recovered from the drying process. In actuality, percentage of bisulfite may be somewhat less than stated due to loss of bisulfite during drying.

Another two samples of bisulfite-containing egg white, identified in Table I as Samples D and E, were prepared by homogeneously mixing bisulfite with 10,000 pounds of liquid microbially desugared egg white which contained about 11.5% solids. The mixing was conducted in a vat and the mixture was spray-dried in a box-type spray dryer to a substantially dry and flowable material. Stated percentages of sodium bisulfite are theoretical. In actuality, the percentages may be somewhat less than stated due to loss of some bisulfite in the drying process.

A dried egg-white control, identified in Table I as Control, was also prepared and contained no added bisulfite. Samples A through E and the Control were analyzed for sulfhydryl content which may be an indication of egg white functionality. A UV spectroscopy method was used based on the reaction of p-chloromercuribenzoate with three sulfhydryl groups present in ovalbumen (Boyer, P. D., J. Am. Chem. Soc. 76, 4331, 1954). Results are shown below in micromoles of SH per gram of egg white solids and assumes a molecular weight of 46,000. The ovalbumen standard used in the Table below was obtained from the Sigma Chemical Co., No. A-2512, Egg Ovalbumen, crystallized and lyophilized, salt-free, grade VI, electrophoretic purity about 99% and nitrogen content about 15%.

TABLE I

| Sample | DRIED EGG WHITE COMPOSITIONS | | | | |
|---|---|---|---|---|---|
| | Amount (in grams) of $NaHSO_3$ added to Liquid Egg White | Yield (in grams) of dried egg white composition | Percent Sodium Bisulfite in Dried Egg White Composition | ΔAbsorbance (250 mm) | Sulfhydryl Content $\mu$ moles/grams |
| A | 0.1 | 1000 ± 100 | 0.01 | 0.313 | 50 |
| B | 0.5 | 1000 ± 100 | 0.05 | 0.325 | 51 |
| C | 1.32 | 933 | 0.14 | 0.340 | 53 |
| D | 1044 | — | 0.20 | 0.389 | 62 |
| E | 5220 | — | 1.0 | 0.422 | 67 |
| Control | — | — | — | 0.335 | 53 |
| Ovalbumen Standard | — | — | — | 0.239 | 37 |

EXAMPLE II

Dried egg white compositions of Example I (Samples A, B and C) were used in the preparation of angel food cakes. Twin-packet dry angel food cake mixes comprising an "A" package having the egg white composition of Example I, sugar, salt and whipping aid and a "B" package having sugar, flour, starch, leavening agents, hydrogenated vegetable oil hardstock (IV, less than 10) and flavoring were prepared. In each cake formulation, the egg white sample of the A packet was used at the same amount (21.03% by weight of the A mix). In each case, the contents of the A mix were added to water and whipped to a foam. The contents of the B packet were folded into the foam and the resulting batter was baked to an angel food cake. The results for cakes utilizing the sample egg white compositions of Example I and the Control egg white material are set forth in Table II.

TABLE II

| Batch | Bake Height mm. | % Cupping On Inverted Cake Surface | Comments |
| --- | --- | --- | --- |
| Control | 12.5 | 20 | Many cups |
| A | 11.6 | 12 | Reduced cups |
| B | 12.6 | 8 | Significantly reduced cups. Slightly whiter grain. |
| C | 12.8 | 0 | Cups eliminated - whiter grain. |

As can be seen from the results set forth in Table II, cakes containing bisulfite-treated egg white materials A, B and C were substantially improved in cupping properties relative to cakes prepared from the control egg white material which contained no bisulfite.

EXAMPLE III

Dried egg white compositions of Example I (D and E) were utilized in the preparation of angel food cake mixes and cakes in the manner of Example II except that the hydrogenated vegetable oil hardstock of the B package was employed in a slightly greater amount. The results of cakes prepared are set forth in Table III.

TABLE III

| Batch | Bake Height mm. | % Cupping On Inverted Cake Surface | Comments |
| --- | --- | --- | --- |
| Control | 12.5 | 6 | Control |
| D | 11.6 | 0 | No cups —whiter grain. |
| E | 11.3 | 0 | No cups —whiter grain —slight sulfur odor. |

As can be seen from the results set forth in Table III, the cakes containing bisulfite-treated egg white materials D and E were improved in cupping properties relative to cakes prepared from the control egg white material which contained no bisulfite.

EXAMPLE IV 0.1 gm. of sodium bisulfite was uniformly mixed into an A mix of a twin-packet angel food cake formulation comprising enzymatically desugared dry egg white, sugar, cream of tartar, salt and flavoring. The B-packet, as used herein, contained sugar, flour, wheat starch, and hardstock. These mixes were put in a control room along with regular mix to study shelf life. Angel food cake batters were made therewith. The bake results are set out in Table IV and V.

The mixes in Table IV were stored for 3 weeks at 50°F before using.

TABLE IV

| Batch | Height mm | % Cupping | Comments |
| --- | --- | --- | --- |
| I | 12.6 | 18 | No bisulfite added |
| II | 13.1 | 0 | Whiter grain. 0.1 gm. bisulfite added. |

The cake mixes of Table V were aged for 12 weeks at 100°F and 70% relative humidity, which conditions are equivalent to 12 months storage on the market.

TABLE V

| Batch | Height mm | % Cupping | Comments |
| --- | --- | --- | --- |
| I | 12.4 | 35 | More cupping than unaged package |
| II | 12.1 | 2 | Very little cupping. Better shelf-life, whiter grain. |

It should be noted that there was about twice as much cupping in the above regular, batch I, angel food cake than there was in the unaged I of Table IV.

EXAMPLE V 0.1 gm. of U.S.P. sodium bisulfite was added to an angel food cake twin-packet mix by dissolving it in the water, 320 ml, prior to adding the A-packet, 210 gms. This A-packet contained about 21% of enzymatically desugared dried egg white which is about 44 gms. Thus, the amount of bisulfite added constituted about 0.23% by weight of the egg white. The A-packet was added to water containing the bisulfite and whipped. The B-packet, 216 gms. which contained sugar and farinaceous material, was folded into the whip and the batter was put in a pan and baked in an oven at 375°F using low top heat for about 35 minutes.

A regular mix, the same as above except that no bisulfite was added, was made and baked in the same oven at the same time. The regular bake had a cake height of about 12.4 mm and 10% cupping on the inverted surface of the cake. The bake with 0.1 gm. bisulfite added had a cake height of about 12.6 mm and 0% cupping. The results are set forth in Table VI.

Similar results are obtained when the sodium bisulfite of Example V is replaced on an equimolar basis with potassium bisulfite.

EXAMPLES VI–VIII

In order to show the effects of bisulfite on the functionality of dried egg white in angel food cake mixes, A-packet mixes were prepared having the following levels of dried egg white 15, 16 and 17 per cent by weight of the A-packet. Bakes were made following the process of Example V. In each case 0.1 gms. of bisulfite was added to the water before the A-packet. The results are tabulated in Table VI. The first bake tabulated was made from a regular twin-packet mix having an A-packet containing about 21% dried egg white as set out in Example V.

TABLE VI

| % Egg White In "A" Packet | White In Total Mix | Height mm | % Cupping | Comments |
|---|---|---|---|---|
| 21 | 10.5 | 12.4 | 10 | No NaHSO₃ added |
| 21 | 10.5 | 12.6 | 0 | 0.1 gm. NaHSO₃ added; 0.23% of egg white |
| 15 | 7.5 | 12.5 | 0 | 0.1 gm. NaHSO₃ added; 0.32% of egg white |
| 17 | 8.5 | 12.6 | 0 | 0.1 gm. NaHSO₃ added; 0.28% of egg white |
| 16 | 8.0 | 12.1 | 0 | 0.1 gm. NaHSO₃ added; 0.30% of egg white |

NOTE:
The total weight of the A packet in each of the above was 210 gms.

It is clear from the above data that a marked improvement is obtained by addition of bisulfite to the dried egg white. The cake made with 15% egg white represents more than 28% reduction in the level of egg white used in the standard formulation. Yet, the cake height of the 15% A-packet was comparable to the 21% standard commercial formulation without added bisulfite. Thus, it is apparent that even though a larger percentage of the egg white without additive was used in the control angel food cake mix, the mixes containing 15 and 16% egg white to which bisulfite was added gave higher cakes without cupping.

EXAMPLE VII 0.1 gram of NaHSO₃ was dissolved in water and the contents of a single packet commercially available angel food cake mix were added thereto following the instructions on the package. The baking results were compared to bakes without the addition of bisulfite and the results are set out in Table VII, as X and X', the X' containing the added NaHSO₃.

EXAMPLE VIII

The same as Example VII except that a different commercial angel food cake mix was used. The results are set out in Table VII as Y and Y', the Y' containing the added NaHSO₃.

TABLE VII

| Commercial Mixes | Grams of NaHSO₃ | Bake Height Inches | % Cups |
|---|---|---|---|
| X | — | 4.60 | 5 |
| X' | 0.1 | 4.40 | 0 |
| Y | — | 4.90 | 15 |
| Y' | 0.1 | 4.90 | 0 |

These one-packet commercial mixes are estimated as containing from about 6 to about 12% dried, desugared egg white solids by weight of the total mix. The X angel food cake one-step mix lists on the package the following ingredients: sugar, flour (bleached), dried egg whites, modified wheat and corn starches, leavening, artificial flavor, calcium chloride, citric acid, enzyme modified soy protein, sodium lauryl sulfate.

The Y white angel food cake one-step mix lists the following ingredients on the package: sugar, enriched bleached flour, dried egg whites with sodium lauryl sulfate, wheat starch, leavening, cellulose gum and artificial flavoring.

The package directions for these commercial angel food cake mixes were followed; except, of course, 0.1 gm. of NaHSO₃ was added to X' and Y'.

EXAMPLE IX

A basic angel food cake mix is prepared having the following composition:

| | Ingredients | Amount % |
|---|---|---|
| "A" package | Sugar | 38.0 |
| | Dried egg white (9% moisture; 0.16% sodium bisulfite) | 10.4 |
| | Cream of tartar - tartaric acid | 0.6 |
| | Salt | 0.2 |
| | Flavoring | 0.3 |
| "B" package | Sugar | 29.2 |
| | Flour | 13.0 |
| | Starch | 7.0 |
| | Chemical Leavening | 0.7 |
| | Flavoring | 0.1 |
| | Hydrogenated vegetable oil hardstock | 0.5 |

Cake batter is prepared by adding the contents of the A package to 1⅓ cups of water and mixing for 1 minute with an electric mixer at low speed. The mixer is then operated at high speed for about 3 minutes until the mixture forms stiff peaks. The mixer is then readjusted to low speed, and the contents of the B package are added gradually over a period of one-half minute. The mixing is continued for 1 minute. The batter is poured into a 10 × 4-inch tube pan and cut through once to remove air bubbles. It is then baked for about 40 minutes in an oven at a temperature of 375°F. The pan is removed from the oven, and inverted on a support for about 1 hour. The cakes are removed from the pans and have little or no cupping.

In conclusion, the present improved egg white has a major use in the formulation of angel cake mixes. A less amount of expensive egg white is required in the formulation, plus, the cupping problem is eliminated or reduced.

What is claimed is:

1. In an angel food cake mix comprising sugar, edible farinaceous material and from about 6 to about 12% by weight of dried desugared egg white, the improvement comprising adding an alkali metal bisulfite thereto in an amount of from about 0.005 to about 1.0% by weight of the dried desugared egg white.

2. The angel food cake of claim 1, wherein said bisulfite comprises from about 0.05 to about 0.5% of said egg white.

3. An angel food cake mix in accordance with claim 1 wherein said bisulfite comprises from about 0.14 to about 0.20%.

4. An angel food cake mix in accordance with claim 1 wherein said bisulfite is sodium bisulfite.

5. An angel food cake mix in accordance with claim 1 wherein said bisulfite is potassium bisulfite.

6. In a process for preparing cakes of the foam batter type which comprises preparing a batter from a cake mix containing dried desugared egg white, sugar, and edible farinaceous material, the improvement comprising including in said batter an alkali metal bisulfite to an amount of from about 0.005 to about 1.0% by weight of said dried desugared egg white.

7. The process of claim 6 wherein said bisulfite comprises from about 0.05 to 0.50% by weight of dried desugared egg white.

8. The process of claim 6 wherein said bisulfite comprises from 0.14 to 0.20% by weight of dried desugared egg white.

9. The process of claim 6 wherein said bisulfite is sodium bisulfite.

10. The process of claim 6 wherein said bisulfite is potassium bisulfite.

11. The process of claim 6 wherein said mix is a twin-packet angel food cake mix having a first packet comprising said desugared egg white and said alkali metal bisulfite; and a second packet containing sugar and farinaceous material.

* * * * *